March 3, 1936. L. TENGEL 2,032,819
ARTIFICIAL BAIT
Filed March 6, 1933
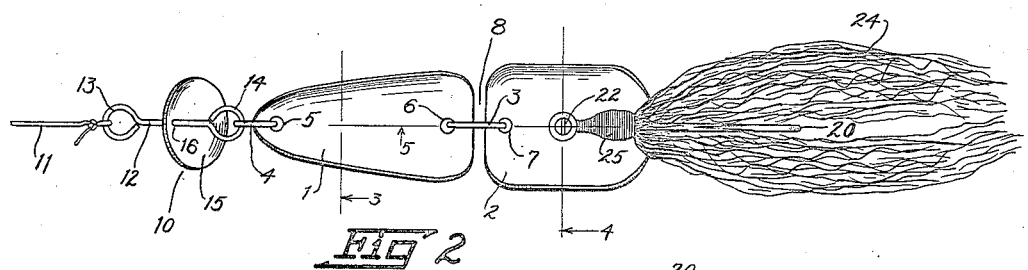
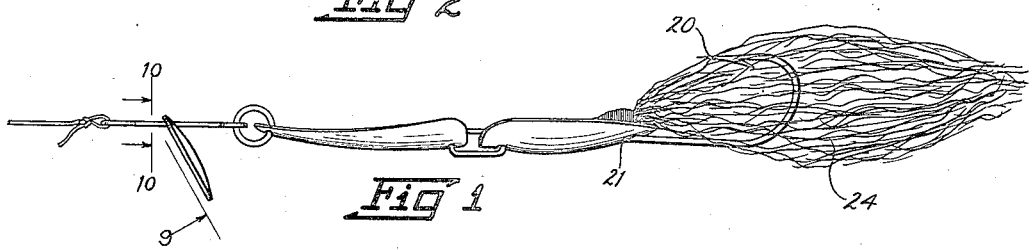
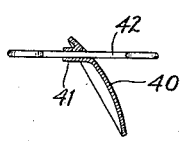
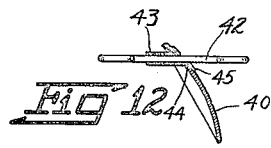
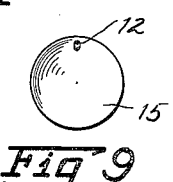
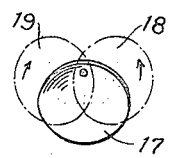
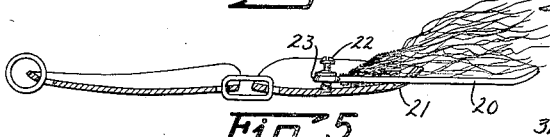
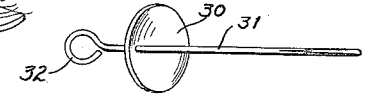
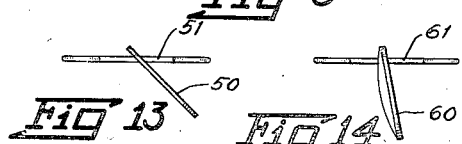
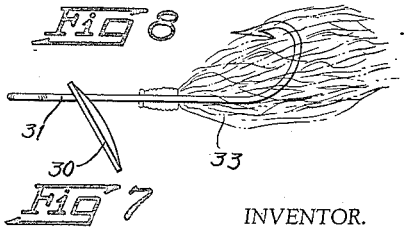
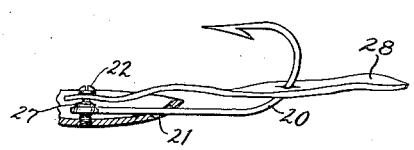
INVENTOR.
Louis Tengel.
BY Slough and Canfield
ATTORNEY.

UNITED STATES PATENT OFFICE 2,032,819

ARTIFICIAL BAIT

Louis Tengel, Geneva, Ohio, assignor to The American Fork & Hoe Company, Cleveland, Ohio, a corporation of Ohio Application March 6, 1933, Serial No. 659,637

14 Claims. (Cl. 43—42)

This invention relates to lures or artificial bait for use in the art of fishing.

It has been found that fish are attracted by a lure or artificial bait which in appearance and/or movements when drawn through the water, simulates, to some degree at least, the appearance and/or movements of live bait.

It is therefore an object of my invention to provide an improved lure or artificial bait.

Another object of my invention is to provide an improved lure or artificial bait which, when drawn through the water by the fishing line attached thereto, will react upon the water in an improved manner to effect independent life simulating movements.

Another object is to provide a fish lure or artificial bait of the class referred to which will effect an improved sinuous movement.

Another object is to provide a lure or artificial bait having associated therewith an oscillation producing means which when drawn through the water by the fishing line will move with an improved life-like wiggling or sinuous movement.

Another object is to provide an improved means adapted for use with a fish hook or lure provided with a hook which when drawn through the water will move with an oscillatory movement and will transmit such movement to the hook or lure.

Another object of my invention is to provide improved means for causing wiggling, oscillation or sinuous movement of an artificial bait which will be non-fouling with weeds or the like and which will successfully bend away weeds and other detriments.

Another object of my invention is to provide an improved device of the general class referred to in this art as "spinners" but which will operate in an improved manner, to move with a periodic or oscillatory movement when drawn through the water and which by its movement may attract fish; and which may also be associated with an artificial bait or lure to communicate life-like movements.

Other objects of the invention will be apparent to those skilled in the art to which my invention appertains.

My invention is fully disclosed in the following description taken in connection with the accompanying drawing, in which:

Fig. 1 is a side elevational view of a lure or artificial bait embodying my invention illustrating the lure in the position which it normally takes when drawn through the water by the fishing line;

Fig. 2 is a top plan view of the lure or bait of Fig. 1;

Figs. 3 and 4 are cross-sectional views taken respectively from the planes 3 and 4 of Fig. 2;

Fig. 5 is a longitudinal sectional view taken from the plane 5 of Fig. 2;

Fig. 6 is a fragmentary view similar to a part of Fig. 5 illustrating a modification;

Figs. 7 and 8 are, respectively, views similar to Figs. 1 and 2 but illustrating another modification;

Fig. 9 is a fragmentary view taken from the plane 9 of Fig. 1;

Fig. 10 is a fragmentary view taken from the plane 10 of Fig. 1 and with an element thereof shown in different positions which it may assume in the operation of the device;

Figs. 11, 12, 13, and 14 are views similar to a part of Figs. 1 and 2 illustrating in modified forms an oscillation device which I may employ and one form of which is shown in Figs. 1 and 2.

Referring to the drawing, I have shown at 1 and 2 a pair of sheet metal body portions connected together by a link 3, the forward body portion 1 having at the forward end thereof a link 4.

The body portion 1 preferably is elongated in the longitudinal direction of the lure, that is to say, in the direction in which it is drawn through the water, and is formed from sheet metal by cutting and pressing operations, preferably being press-formed from a flat blank stamped out of a metal sheet. As shown in the drawing, the body portion 1 is upwardly concave, both laterally and longitudinally, and is in general in the form of an isosceles triangle with rounded corners at the base and a rounded apex.

Perforations 5 and 6 are made on the longitudinal line of the body portion 1 for loosely receiving the links 4 and 3 respectively.

The body portion 2 is preferably made by the process described for making the body portion 1 and is generally in the form of a rectangle with rounded corners on the forward end thereof and with the rearward end thereof generally rounded.

The body portion 2, like the body portion 1, is concave upwardly both transversely and longitudinally and is provided with a perforation 7 for the link 3.

The links 4 and 3 fit in their perforations 5, 6 and 7 loosely with plenty of clearance in the perforations and the two body portions 1 and 2 are spaced longitudinally as at 8 whereby the two body portions have free independent movement.

The device indicated generally at 10 will now be described whereby, when the lure including the device 10 is drawn through the water by the fishing line 11, the device 10 will give to the lure as a whole including the body portions 1 and 2, a life-like sinuous or wiggling movement.

The device 10 comprises a spindle or shaft 12 having eyes 13 and 14 formed in the forward and rearward ends thereof, the shaft portion 12 connecting the eyes 13 and 14, being preferably straight or linear and extending generally in the direction of the line 11 when the latter pulls upon the eye 13 to which it is attached. For these purposes, the shaft 12 and eyes 13 and 14 thereon are preferably formed from wire.

Secured to an intermediate portion of the shaft 12 is a metal disc 15 secured to the shaft 12 by projecting the latter through a perforation 16 adjacent one edge of the disc and rigidly securing the disc to the shaft as by soldering or other means. The disc is preferably disposed so that it is inclined rearwardly with respect to the straight part 12 of the shaft and with respect to the direction of movement of the lure through the water when propelled by the line 11.

Preferably also the disc 15 is circular and dished concave forwardly as illustrated in Figs. 1 and 2; and as will be observed, the greater part of the mass of the disc 15 is disposed at one side of the shaft 12.

When the lure comprising the body portions 1 and 2 and the device 10 are drawn through the water by the line 11, the disc 15 will swing from side to side in the general nature of a pendulum, as shown generally in Fig. 10, from a central or intermediate position 17 to lateral positions 18 and 19 successively, and this continuous oscillatory movement is communicated to the forward end of the body portion 1 giving it a transverse oscillatory movement which is correspondingly communicated to the body portion 2 and causes the two body portions and/or the two porions and the device 10 to move with the above referred to sinuous or wiggling movement.

The disc 15 being connected to the stem 12 and the latter being connected through the eye 14 and link 4 with the body portion 1, permits the disc 15 to swing from side to side freely when reacted upon by the water through which it is drawn.

A hook 20 is preferably secured to the body portion 2 extending rearwardly therefrom and with the point or barb thereof disposed above and rearwardly of the body portion 2 as illustrated in the drawing. The shank of the hook may be projected through a perforation 21 in a rearward portion of the body portion 2 and may be secured thereto by a screw 22 projected through the usual eye 23 of the hook and threaded into the body portion 2, as illustrated.

A buck tail 24 may be provided secured to the hook 20 by a wrapping 25 in the usual manner or in any desired manner.

Preferably the screw 22 is provided with a shoulder 27 and an overhanging head 26 so that when the screw is drawn up tight, the overhanging head 26 may serve as a button over which a pork rind 28 having the usual slits therein may me passed to secure it on the screw. Thus the pork rind 28 may be used with the buck tail 20 or either can be used alone.

The sinuous movement above described, as will now be apparent, will be communicated throughout the entire lure including the buck tail 20 and/or the pork rind 28 to the extreme rear end thereof. During this movement, the two body portions 1 and 2 may swing from side to side independently and oscillate on their longitudinal center line independently due to the reaction of the water on the surfaces, particularly the lower convex surfaces thereof.

However, the exact construction of the body portions 1 and 2 and the connections therebetween and/or the mounting of the hook, buck tail and/or pork rind form no essential part of my invention, and various constructions of lure body may be employed with the device comprising the shaft 12, eyes 13 and 14 and disc 15.

Again, the advantages of my invention may be practiced with a single lure body instead of the jointed body illustrated in Figs. 1 and 2.

In Figs. 7 and 8 I show an extremely simplified form of lure embodying my invention. In this form, a disc 30 similar to the disc 15 of Figs. 1 and 2 is secured directly upon the shank 31 of a fish hook having an eye 32 to which a line may be attached. Rearwardly of the disc 30 the hook may be provided with a buck tail 33 as indicated in Fig. 7.

When the line, attached to the eye 32, draws through the water the lure of Figs. 7 and 8, the reaction of the water upon the disc 30 will cause it to oscillate like a pendulum and swing from side to side causing the lure as a whole to move through the water with a life-like or life simulating movement attractive to fish.

In some cases it may be preferable to form the disc 30 from metal and provide the same with light reflecting surfaces to gain the attention of the fish.

As will now appear, therefore, the oscillation producing means comprising particularly the disc 30 may itself be employed as the essential part of the lure as in Figs. 7 and 8, and other forms which will occur to those skilled in the art, or it may be regarded as a part of a lure as in Figs. 1 and 2.

In the forms of Figs. 1 and 2 or 7 and 8, the disc is secured to a shaft extending simply through a perforation adjacent the edge of the disc. If it be desired to more durably and rigidly secure the disc to the shaft, the construction of Fig. 11 may be employed. In this form, the disc 40 has a sleeve 41 pressed out to the concave side thereof, which sleeve is telescoped over the shaft 42 and soldered thereon.

In Fig. 12 a sleeve 43, made as a separate piece, is first telescoped through a perforation 44 in the disc and flanged at its end as at 45, the flange overlying the convex portion of the disc 40 adjacent the perforation and soldered thereto; and the sleeve 43 telescoped over and soldered to the shaft 42.

As illustrated in Fig. 13, the disc, in this case 50, may be a flat disc; and furthermore as shown in Fig. 13, the disc, whatever its form, may be inclined at a relatively acute angle to the shaft 51.

In Fig. 14 is shown a disc 60 inclined at a more obtuse angle to the shaft 61 and in this instance as shown the disc may be convex forwardly instead of rearwardly.

Thus many changes and modifications may be made both in the oscillating device referred to generally as at 10 and in the lure as a whole comprising the device 10 and the lure body when used.

My invention is not limited to the exact details of construction shown and described.

I claim:

1. A fish lure comprising a hook, a spoon-like body to which said hook is rigidly attached by its eye and with its barb projected rearwardly therefrom, a shaft-like element having provision at its forward end for the attachment of a fishing line thereto and making interconnection with the forward end of said body by a universal joint interconnecting means, and a vane rigidly connected to said element and disposed mostly to one side thereof and extending rearwardly from its point of affixation to said element in a direction oblique to the axis of said element, whereby said vane is caused to oscillatably swing and to laterally alternately deflect said element when the lure is drawn through the water by tractive efforts on the line, said universal joint interconnecting means being thereby caused to communicate from said element to said body erratic lateral movements in all lateral directions.

2. A fish lure comprising a hook, a spoon-like body to which said hook is rigidly attached by its eye and with its barb projected rearwardly therefrom, a shaft-like element having provision at its forward end for the attachment of a fishing line thereto and making interconnection with the forward end of said body by a universal joint interconnecting means, and substantially flattened vane rigidly connected to said element and disposed mostly to one side thereof and extending rearwardly from its point of affixation to said element in a direction oblique to the axis of said element, whereby said vane is caused to oscillatably swing and to laterally alternately deflect said element when the lure is drawn through the water by tractive efforts on the line, said universal joint interconnecting means being thereby caused to communicate from said element to said body erratic lateral movements in all lateral directions, said substantially flattened vane being in the form of a shallow dish rigidly secured near an edge portion to said shaft.

3. A fish lure comprising a hook, a spoon-like body to which said hook is rigidly attached by its eye and with its barb projected rearwardly therefrom, a shaft-like element having provision at its forward end for the attachment of a fishing line thereto and making interconnection with the forward end of said body by a universal joint interconnecting means, and a vane rigidly connected to said element and disposed mostly to one side thereof and extending rearwardly from its point of affixation to said element in a direction oblique to the axis of said element, whereby said vane is caused to oscillatably swing and to laterally alternately deflect said element when the lure is drawn through the water by tractive efforts on the line, said universal joint interconnecting means being thereby caused to communicate from said element to said body erratic lateral movements in all lateral directions, said vane being in the form of a shallow dish rigidly secured near an edge portion to said shaft, and presenting its concaved side towards the line attaching end of said shaft.

4. A fish lure comprising a hook, a spoon-like body to which said hook is rigidly attached by its eye and with its barb projected rearwardly therefrom, a shaft-like element having provision at its forward end for the attachment of a fishing line thereto and making interconnection with the forward end of said body by a universal joint interconnecting means, and a vane rigidly connected to said element and disposed mostly to one side thereof and extending rearwardly from its point of affixation to said element in a direction oblique to the axis of said element, whereby said vane is caused to oscillatably swing and to laterally alternately deflect said element when the lure is drawn through the water by tractive efforts on the line, said universal joint interconnecting means being thereby caused to communicate from said element to said body erratic lateral movements in all lateral directions, said body being formed of relatively thin sheet material and having generally concave and convex surfaces each of considerably greater area than the opposite side surfaces of said vane.

5. A fish lure comprising a hook, a spoon-like body to which said hook is rigidly attached by its eye and with its barb projected rearwardly therefrom, a shaft-like element having provision at its forward end for the attachment of a fishing line thereto and making interconnection with the forward end of said body by a universal joint interconnecting means, and a vane rigidly connected to said element and disposed mostly to one side thereof and extending rearwardly from its point of affixation to said element in a direction oblique to the axis of said element, whereby said vane is caused to oscillatably swing and to laterally alternately deflect said element when the lure is drawn through the water by tractive efforts on the line, said universal joint interconnecting means being thereby caused to communicate from said element to said body erratic lateral movements in all lateral directions, said vane being in the form of a shallow dish rigidly secured near an edge portion to said shaft, and presenting its concaved side towards the line attaching end of said shaft, said body being formed of relatively thin sheet material and having its generally concave and convex surfaces each of considerably greater area than the opposite side surfaces of said vane.

6. A fish lure comprising a shaft element having line attaching means at a forward portion thereof and at a rearward portion connected to a lure element and to a hook, and a vane element rigidly secured to an intermediate portion of the shaft element with the greater portion thereof on one side of the shaft element axis and extending rearwardly away from its line attaching end at an angle to the shaft element, whereby the vane is caused to oscillatably swing about the shaft axis when the lure is drawn through the water by a line and communicates laterally alternate deflected movements to the lure element and hook.

7. A fish lure as described in claim 6 and in which the vane is a sheet metal disc rigidly secured to the shaft element at the portion adjacent the disc periphery.

8. A lure as described in claim 6 and in which the vane is a sheet metal forwardly concave member rigidly secured to the shaft element at the portion adjacent its periphery.

9. A fish lure having a lure element body, and hook, and comprising a shaft element having line attaching means at a forward portion thereof and at a rearward portion connected to a lure body with a universal movement connection, a vane element rigidly secured to an intermediate portion of the shaft element with the greater portion thereof on one side of the shaft element, and extending rearwardly away from its line attaching end at an angle to the shaft element, whereby the vane is caused to oscillatably swing about the shaft axis when the lure is drawn through the water by a line and communicates laterally alternate deflected movements to the lure element, body and hook.

10. A lure as described in claim 9 and in which the vane is a sheet metal disc rigidly secured to the shaft element at a point adjacent its periphery.

11. A lure as described in claim 9 and in which the vane is a sheet metal dished member rigidly secured to the shaft element at a point adjacent its periphery and forwardly concave.

12. A fish lure comprising a shaft element having line attaching means at a forward portion thereof, and at the rearward portion connected to a lure body with a universal movement connection, the body comprising a pair of concavo-convex body elements linked together with a universal movement connection and disposed in the longitudinal direction of the shaft element, and the rearward body element carrying a hook, and a vane element rigidly secured to an intermediate portion of the shaft element with the greater portion thereof on one side of the shaft element and extending rearwardly away from its line attaching end at an angle to the shaft element, whereby the vane is caused to oscillatably swing about the shaft axis when the lure is drawn through the water by a line and communicate laterally alternate deflected movements to the lure body elements and hook.

13. A lure as described in claim 12 and in which the vane is a sheet metal disc secured to the shaft element at a portion thereof adjacent its periphery.

14. A lure as described in claim 12 and in which the vane is a sheet metal dished member rigidly secured to the shaft element at a portion adjacent its periphery and disposed forwardly concave.

LOUIS TENGEL.